UNITED STATES PATENT OFFICE.

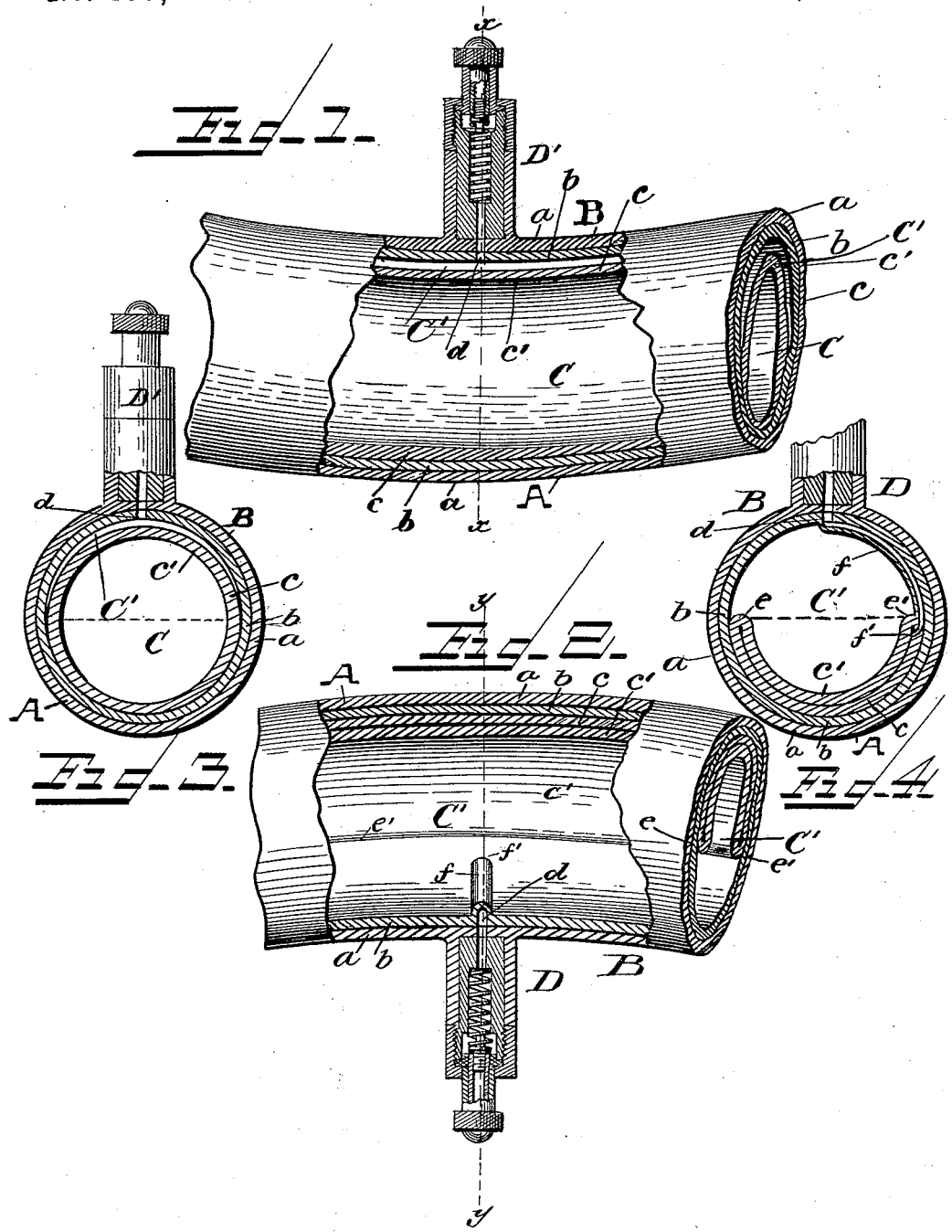

WALTER SHERBONDY, OF AKRON, OHIO.

PNEUMATIC TIRE.

SPECIFICATION forming part of Letters Patent No. 499,600, dated June 13, 1893.

Application filed April 17, 1893. Serial No. 470,713. (No model.)

*To all whom it may concern:*

Be it known that I, WALTER SHERBONDY, a citizen of the United States, and a resident of Akron, in the county of Summit and State of Ohio, have invented certain new and useful Improvements in Pneumatic Tires; and I do hereby declare that the following is a full, clear, and exact description of the invention, which will enable others skilled in the art to which it appertains to make and use the same, reference being had to the accompanying drawings, which form a part of this specification, and in which—

Figure 1 is a view of a portion of my improved pneumatic tire, as it appears in the lower part of the wheel, with one side of the tire broken away to show its interior build or construction. Fig. 2 is a transverse sectional view of the same on line $x$—$x$ in Fig. 1. Fig. 3 is a view of a portion of the same tire from the upper part of the wheel, also broken away in part, on one side, to show the use of the auxiliary air-chamber and the manner in which this is formed by a portion of the innermost layer or lining of the tire; and Fig. 4 is a transverse sectional view on line $y$—$y$ in Fig. 3.

Like letters of reference denote corresponding parts in all the figures.

My invention relates to pneumatic tires for the wheels of bicycles, sulkies, and other forms of vehicles in which such tires may be used with advantage, of that type or class which are known as "self-healing;" that is to say, provided with means for the cure or repair of a rupture of the tread of the tire, whereby the air would be let out of the tire and thus, ordinarily, render the same useless. There are several types of these "self-healing tires" (so-called), and my invention relates to that particular type in which the tubular tire is provided with an interior flexible diaphragm or partition, dividing the tubular tire longitudinally into two divisions or compartments, each provided with its appropriate air-valve for inflating it, and one of which said chambers, when properly inflated, constitutes the normal tire, while the other forms an auxiliary chamber to be inflated to its full capacity only when required for use in the event of the accidental puncture or rupture of the tread of the inflated tire and the consequent collapse (in whole or in part) of the main air-chamber.

My improvement consists in the specific formation of the tire whereby the auxiliary air-chamber is formed, as will be hereinafter more fully described and particularly pointed out in the claim.

Referring to the drawings, the reference letter A denotes that part of a rubber tire which constitutes the "tread" or running portion of the tire, and B the concave inner rim which rests or is seated in the grooved metallic rim of the wheel (not shown). This body, A B, of the tire is made of rubber, in the nature of an endless tube built up from two or more (never less than two) layers; and, in the present illustration of my improved tire, is shown as consisting of three separate concentric layers, designated respectively by the reference letters $a$, $b$ and $c$. In other words, the tubular tire is composed of an endless three-ply fabric, so as to form a tread, A, of the proper thickness to be strong and durable and resist wear. These several concentric layers are cemented to one another on the outside half-part or "tread" part of the tubular tire, so as to form a solid thickness below the dotted line shown in the cross sections Figs. 3 and 4, which said line intersects the center of a circle of which the inflated tire constitutes the periphery; but the part above or on the other side of said diametrical line, *i. e.*, the part, B, which rests in the grooved tire-seat of the rim of the wheel to which the tire is to be affixed, has the innermost concentric layer of elastic fabric, $c'$, left loose and not cemented to or upon the fabric $a\ b$—that is to say, from points diametrically opposite to each other, and indicated by the termini of the dotted lines shown in Figs. 3 and 4, the innermost concentric layer of fabric, $c$ is separated from the adjacent concavo-convex part, $a, b$, of the endless tube, so as to form, normally, a narrow open concavo-convex slit, C′, between said loose part $c'$ and the contiguous solid two-ply part $a\ b$. The inner, (*i. e.* concave) rim of this compound or three-ply tire is perforated at $d$ for the attachment of the inflating-tubes and air-valves D and D′ through which the main-chamber C and auxiliary chamber C′ are respectively inflated and exhausted when desired. The valve-tube D, which communicates with chamber C, may for this purpose have a short connecting-tube or duct, $f$, leading from the inlet or opening $d$ along the inner wall of the tire on one side, to a point $e'$, where the loose part $c'$ of the innermost layer or concentric lining-tube $c$ is united to the side of the solid part $a\,b$ of the tire, and at this point opening up into the space between the two parts $c'$ and $c$ of the innermost layer or lining-tube, as shown at $f'$ and $e'$ in Figs. 2 and 4, which illustrates the use of the loose half-part of the innermost tube $c\,c'$ in forming the auxiliary air-chamber $C'$. As regards the air-valves and their arrangement, they may be of any desired construction and form no part of my present improvement.

From the foregoing description, taken in connection with the drawings, it will be seen that by leaving the inner half-part of the innermost concentric layer of elastic fabric $c\,c'$ loose, two separate divisions are formed longitudinally in the endless three-ply tube which forms the tire, viz: an inner concavo-convex rim-chamber $C'$, and an outer (approximately circular) tread-chamber C. It will also be seen that this inner concavo-convex chamber $C'$ may be inflated through the air-valve $D'$, so that its diaphragm $c'$ will assume the inverted position illustrated in Figs. 2 and 4, forming rounded corners $e$ and $e'$ along the opposite edges where it is fastened solidly to the adjacent layer $b$, and fitting down closely and tightly upon the inside part of the three-ply "tread" $a\,b\,c$, so as to form practically a four-ply "tread" A, as clearly shown in Fig. 4.

I am aware that it is not new, broadly, to construct a pneumatic tire with an interior longitudinal diaphragm for the purpose of forming two separate compartments in the tire, either one of which may be inflated at will; but I am not aware that this dividing diaphragm has ever been made as hereinbefore described, i. e. integral with the body of the tire and forming in itself one of the tubular and endless layers of the elastic fabric of which this is built up.

I therefore claim as my invention and desire to secure by Letters Patent of the United States—

A pneumatic tire composed of an outer tube of one or more layers, an inner air-tube cemented to the interior of the outer tube on the "tread" half and separated therefrom on the "rim" half, forming two distinct air-chambers, and means for inflating either chamber; substantially as and for the purpose shown and set forth.

In testimony that I claim the foregoing as my own I have hereunto affixed my signature in presence of two witnesses.

WALTER SHERBONDY.

Witnesses:
 J. M. LOFFE,
 M. SHOULER.